US009635164B2

(12) United States Patent
Smith et al.

(10) Patent No.: US 9,635,164 B2
(45) Date of Patent: Apr. 25, 2017

(54) REMOTE CONTROL FOR ELECTRONIC DEVICE

(71) Applicant: Otter Products, LLC, Fort Collins, CO (US)

(72) Inventors: W. Travis Smith, Fort Collins, CO (US); Dan L. Dalton, Fort Collins, CO (US); Michael E. Jebb, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

(21) Appl. No.: 15/076,035

(22) Filed: Mar. 21, 2016

(65) Prior Publication Data

US 2016/0337497 A1  Nov. 17, 2016

Related U.S. Application Data

(60) Provisional application No. 62/161,801, filed on May 14, 2015.

(51) Int. Cl.
| | |
|---|---|
| *H04M 3/00* | (2006.01) |
| *H04M 1/725* | (2006.01) |
| *H04W 4/00* | (2009.01) |
| *H04W 4/12* | (2009.01) |
| *H04W 12/06* | (2009.01) |
| *H04W 8/18* | (2009.01) |

(52) U.S. Cl.
CPC ....... *H04M 1/7253* (2013.01); *H04M 1/7255* (2013.01); *H04W 4/008* (2013.01); *H04W 4/12* (2013.01); *H04W 8/183* (2013.01); *H04W 12/06* (2013.01)

(58) Field of Classification Search
CPC ..... H04W 12/06; H04W 8/183; H04W 88/06; H04W 12/08; H04W 4/24; H04W 76/021; H04W 84/12; H04W 88/04; H04L 63/08; H04L 67/306; H04L 63/102; H04L 63/0823; H04L 63/0861; H04L 2463/102; H04L 63/04
USPC .. 455/418, 432.1, 552.1, 414.1, 41.1, 435.1, 455/406, 412.1, 419, 426.1
See application file for complete search history.

(56) References Cited

U.S. PATENT DOCUMENTS

| | | |
|---|---|---|
| 7,080,014 B2 | 7/2006 | Bush et al. |
| 7,260,538 B2 | 8/2007 | Calderone et al. |
| 8,260,618 B2 | 9/2012 | Mahlbacher |

(Continued)

*Primary Examiner* — Fred Casca (57) ABSTRACT

A remote control for an electronic device includes a memory for storing a first digitized voice file and a second digitized voice file and a wireless communication module for establishing wireless communication with the electronic device. The remote control also includes first and second user accessible buttons associated with the first and second user accessible buttons, respectively. The remote control also includes a computer processor configured to execute non-transitory instructions to detect a user actuation of one of the first and the second user accessible buttons, retrieve a one of the first and second digitized voice files that is associated with the actuated user accessible button, and transmit the retrieved digitized voice file for delivery to the smartphone in order to remotely trigger a verbally invokable action on the smartphone without verbally speaking a command.

17 Claims, 3 Drawing Sheets

(56) References Cited

U.S. PATENT DOCUMENTS

| | | | | |
|---|---|---|---|---|
| 2005/0256719 A1* | 11/2005 | VanOrman | ............ | G08C 17/02 |
| | | | | 704/275 |
| 2006/0047513 A1 | 3/2006 | Chen | | |
| 2009/0192801 A1 | 7/2009 | Chou | | |
| 2014/0214429 A1* | 7/2014 | Pantel | ................... | G10L 21/16 |
| | | | | 704/275 |

* cited by examiner

REMOTE CONTROL FOR ELECTRONIC DEVICE

CROSS REFERENCE TO RELATED APPLICATIONS

This application claims priority to U.S. Provisional Patent Application No. 62/161,801 filed May 14, 2015, which is hereby incorporated by reference in its entirety.

FIELD

The present disclosure relates to a remote control apparatus for use with electronic devices, such as smartphones and tablet computers. More specifically, the present disclosure relates to a remote control for remotely triggering verbally invokable actions on an electronic device without producing audible sounds.

BACKGROUND

Portable electronic devices are commonly used for communication and entertainment purposes. Portable electronic devices include devices such as smartphones, cellular phones, mobile communication devices, computers, portable computing devices, mobile computing devices, tablet computers, cameras, video players, smart watches, audio players, electronic media readers, two-way radios, global positioning satellite (GPS) devices, and/or other types of electronic computing or communication devices, including combinations thereof. As these types of devices have become ubiquitous, the number of features included in them has increased. At the same time, users have become more reliant on these types of devices and user's expectations regarding the functionality of these types of devices continue to increase.

A software assistant is included in some electronic devices. The software assistant improves the ability and efficiency with which users can request information from the device, command the device to perform an action, and/or otherwise interact with the device. It has become more common for users to initiate requests and interactions with devices through voice commands or requests. Typed entry can be inefficient or inconvenient because some portable electronic devices have relatively small keyboards which may be inefficient for users to type on and/or because it is simply more convenient for a user to speak the request than to type it or enter it into the device using another method. As users become more comfortable with interacting with devices using voice commands, there are situations where issuing a voice command may not be possible or may not be desired. These situations include: circumstances in which the device is too far away to press a button on the device to start a voice command process, circumstances in the which the device is too far away to effectively receive a voice command, circumstances in which the ambient environment is too loud for the device to effectively receive a voice command, circumstances in which the user is unable to or does not want to touch the device, circumstances in which a microphone of the device is covered, and/or circumstances in which the user wishes to make little or no noise.

Furthermore, while it may be technically possible to invoke various features of an electronic device by sending a command to an application running in the background on the device, many devices and/or operating systems limit the operations that applications, particularly background applications, are able to invoke. Therefore, a software application, or app, running in the background may not have the ability to initiate certain processes or functions on the device even though a voice assistant or software assistant may have broader permissions to do so. Therefore, a user may have the most flexibility in making requests to the device through voice commands. However, actual voice commands may be inconvenient, impossible, or undesirable for any of the reasons discussed herein.

Improved apparatuses, methods, systems, and techniques for triggering verbally invokable actions or requests on a portable electronic device, without producing audible sounds, are provided herein.

SUMMARY

Apparatuses, methods, and techniques for triggering actions on an electronic device without producing audible sounds are provided herein. In one example, an apparatus is provided. The apparatus includes a memory for storing a first digitized voice file and a second digitized voice file and includes a wireless communication module for establishing wireless communication with the electronic device using a wireless communication protocol. The apparatus also includes first and second user accessible buttons. The first user accessible button is associated with the first digitized voice file and the second user accessible button is associated with the second digitized voice file. The apparatus also includes a computer processor configured to execute non-transitory computer processor instructions to detect a user actuation of one of the first and the second user accessible buttons and to retrieve a one of the first and second digitized voice files from the memory that is associated with the actuated user accessible button. The computer processor also executes the instructions to transmit the retrieved digitized voice file to the electronic device using the wireless communication module, according to the wireless communication protocol, in order to remotely trigger one of the verbally invokable actions on the smartphone that is associated with the retrieved and transmitted digitized voice file.

Various other embodiments of the apparatuses, techniques, and methods are also disclosed. While multiple embodiments are disclosed, still other embodiments will become apparent to those skilled in the art from the following detailed description and figures, which describe and show illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

DETAILED DESCRIPTION

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Users have become more reliant on portable electronic devices in recent years and use electronic devices, particularly portable electronic devices, for an increasing number and range of tasks. As these devices are used more frequently, users have an increasing desire to interact with the devices verbally in order to make the interactions more efficient and/or convenient. While many portable electronic devices have the capability of receiving voice commands, it may be inconvenient, impossible, or undesirable to issue voice commands to the device in some situations. In other situations, there may simply be a desire to remotely activate functions on the electronic device when it is not within reach. Apparatuses, methods, and techniques are provided herein for resolving these and other problems.

Figure 1:
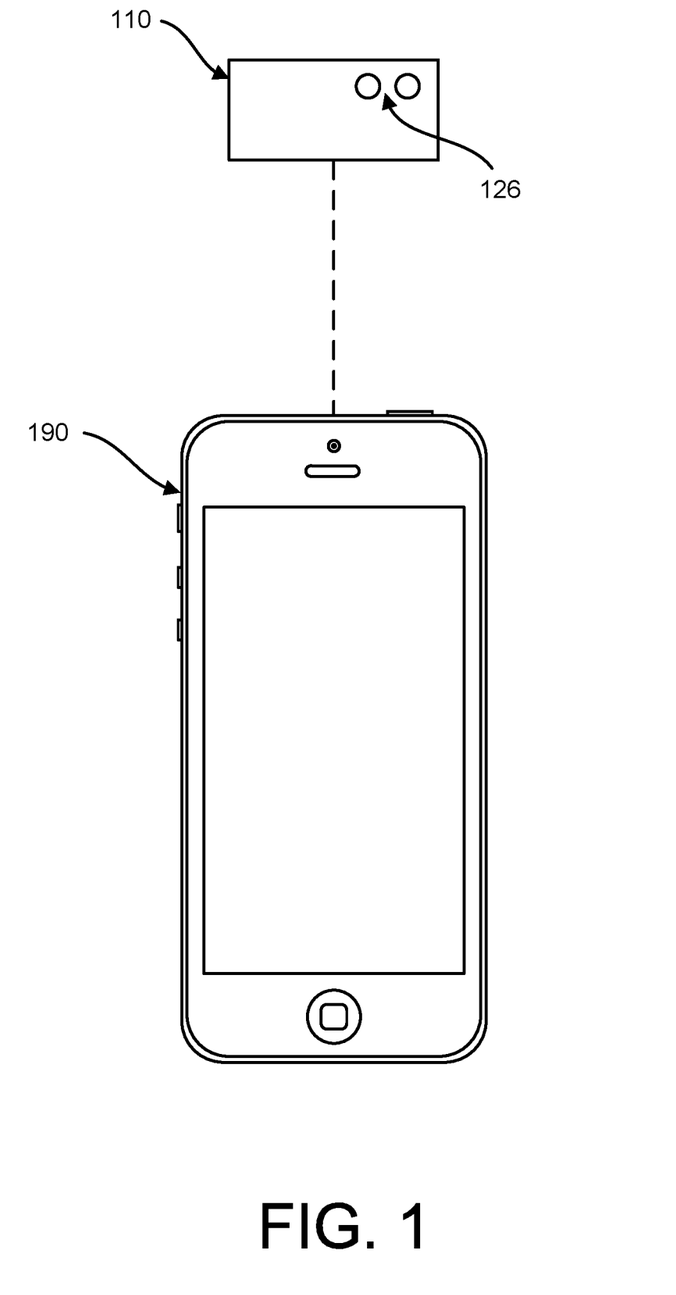
FIG. 1 illustrates a remote control apparatus used with a portable electronic device.

FIG. 1 illustrates a remote control apparatus 110 for use with a portable electronic device 190. Remote control apparatus 110 includes buttons 126 which may be actuated by a user of remote control apparatus 110. Buttons 126 may include any device or combination of devices for receiving input from the user including a button, a switch, a proximity detector, a touch sensitive surface, an interactive control panel, a capacitance sensing device, a pressure sensitive device, an optical sensor, an eye tracking device, and/or combinations thereof. Remote control apparatus 110 may be used to remotely trigger verbally invokable actions on portable electronic device 190 without producing audible sounds. In one example, the user may have portable electronic device 190 inside a bag or backpack and may wish to request an action from portable electronic device 190, such as asking portable electronic device 190 to state the current time, without directly accessing portable electronic device 190.

Portable electronic device 190 may be a cellular phone, smartphone, mobile communication device, mobile computing device, portable computing device, tablet computer, phablet (phone/tablet), portable computer, personal video player, electronic media reader, audio player, handheld scanner, camera, GPS device, or electronic computing or communication device of another type, including combinations thereof. In one specific example, portable electronic device 190 may be an APPLE IPHONE. In another specific example, portable electronic device 190 may be a SAMSUNG GALAXY phone.

In one example of operation, remote control apparatus 110 detects a user input based on actuation of one or more of buttons 126. In response, remote control apparatus 110 retrieves a digitized voice file from a memory of remote control apparatus 110. The digitized voice file is retrieved from among a plurality of digitized voice files in the memory and is selected based on the user input. In other words, a different digitized voice file may be associated with each button and/or with each combination of buttons. Remote control apparatus 110 wirelessly transmits the retrieved digitized voice file from remote control apparatus 110 for delivery to electronic device 190 according to a wireless communication protocol (as illustrated by the dashed line in FIG. 1). The digitized voice file is transmitted in order to remotely initiate an action from among a plurality of actions executable on electronic device 190.

In one example, the digitized voice file may request electronic device 190 to provide a current temperature or to provide a weather forecast. In another example, the digitized voice file may request electronic device 190 to emit a loud noise and/or flash its screen or other optical features in order to assist a user in finding portable electronic device 190 when it has been misplaced. In yet another example, a user may wish to quickly transmit a request for assistance when portable electronic device 190 is not readily within reach, such as when portable electronic device 190 is inside a backpack. In yet another example, a user may wish to request more complex tasks such as requesting an audible recitation of one or more recent emails or text messages without have to pick up, touch, or physically access portable electronic device 190.

The digitized voice file transmitted from remote control apparatus 110 to portable electronic device 190 mimics, emulates, and/or replaces a transmission of a live spoken command delivered to portable electronic device 190 from a microphone, including from a remote wireless microphone, such as from a Bluetooth headset. Even though the digitized voice file has been prerecorded and may or may not even be the actual voice of the user, portable electronic device 190 responds to the request as if the request is a live request just spoken by the user, either through a remote microphone or directly into an integrated microphone of portable electronic device 190.

In some situations, transmitting a digitized voice file to portable electronic device 190 may be more effective than transmitting another type of electronic message or request to portable electronic device 190 because the operating system of portable electronic device 190 may be configured such that many types of requests are blocked until portable electronic device 190 is unlocked. However, the limitations on receiving and responding to voice commands may not be as restrictive. In other words, an operating system of portable electronic device 190 may be responsive to a remote request that is received in the form of a voice command even though the request may not be accepted or processed if it is received in another form because the device is locked or otherwise in a limited operation mode.

For example, many models of APPLE iPhone include Siri. Siri an intelligent personal assistant and/or knowledge navigator. Siri uses a natural language user interface to answer questions, make recommendations, and perform actions by delegating requests to a set of Web services. Siri makes a range of commands, requests, or actions available to a user of the device through voice requests. While many of the examples disclosed herein are described with respect to an IPhone and/or Siri, the apparatuses, methods, and techniques disclosed herein are not to be limited to IPhone or Siri. The apparatuses, methods, and techniques disclosed herein may be used with any type of portable electronic device which is capable of receiving and responding to voice commands.

Beneficially, remote control apparatus 110 allows a user to make the types of requests of portable electronic device 190 which may normally may be made through a voice command, but without actually having to speak, without having to make other sounds, without having to be within reach, and/or without necessarily being in voice proximity to portable electronic device 190. This may also be beneficial in noisy environments where it would be difficult to make an actual voice command due to ambient noise levels. In addition, activation of commonly used features through actuation of a simple button press on a remote apparatus, such as remote control apparatus 110, may be faster, more convenient, more efficient, and/or safer than interacting directly with portable electronic device 190 each time. For example, a delivery driver may frequently need to place calls to a dispatcher while driving. Rather than locating portable electronic device 190, activating it, and then speaking the request to call the dispatcher each time, the driver may simply accomplish the same result with a single button press on remote control apparatus 110 and without even necessarily finding, touching, or directly accessing portable electronic device 190.

While it may be conceivable to initiate requests or functions on a portable electronic device by sending non-voice electronic messages to the portable electronic device or to a software application running on the portable electronic device, voice-based requests are often given broader permissions on the portable electronic device and/or within the operating system of the portable electronic device. In other words, an app running in the background may not have the ability to initiate certain processes or functions on the device, which is sometimes referred to as "sandboxing," even though a voice assistant or software assistant may have broader permissions to initiate some or all of these processes or functions in response to voice requests. Therefore, a user may have the most flexibility in making requests to or initiating actions on the device through voice commands. However, actual voice commands may be inconvenient, impossible, or undesirable for any of the reasons discussed herein. Consequently, a remote control apparatus, such as remote control apparatus 110, which initiates requests or actions through transmission of messages that are formatted as voice requests, as described herein, may provide access to a broader range of functions or features of the electronic device as compared to a remote control which makes requests of the electronic device using traditional methods.

In some configurations, a user may be able to program buttons 126 on remote control apparatus 110 to have user selected functions. Specifically, the user may record their own voice files and associate them with one or more of buttons 126 such that the user's voice file is automatically, and silently, transmitted to portable electronic device 190 every time a button or combination of buttons is pressed. This may be accomplished by recording an audible user input at remote control apparatus 110, encoding the audible user input, storing the encoded audible user input as one or more digitized voice files, and associating the stored digitized voice file(s) with the button or button combination.

Buttons 126 may be pre-programmed or user programmed to request a variety of actions from portable electronic device 190. These actions may include, but are not limited to: initiating a call, listening to a voicemail, playing music, reading a text message, composing a text message, getting directions, accessing notifications, finding calendar information, adding reminders, identifying media content, changing an alarm, requesting sports information, requesting travel information, scheduling an appointment, locating a person, sending a request for help, requesting the time, requesting the date, finding a business, checking weather, checking financial information, performing a web search, requesting entertainment information, performing a calculation, and/or changing a setting on the portable electronic device. Many other actions are possible, but the available actions may be limited by the device, the operating system of the device, and/or the permissions granted to the intelligent software assistant.

In some examples, the recording of a voice file, as described above, may take place on portable electronic device 190 and the recorded voice file may be transferred to remote control apparatus 110 for later use. In other words, the recording process may be performed on either remote control apparatus 110 or portable electronic device 190. A software application, or app, may also be executed on portable electronic device 190 to assist in the setup, configuration, and/or management of remote control apparatus 110. This may include functions such as assigning functions to buttons on the remote, deleting old voice files, rearranging voice files, modifying voice files, managing storage space, changing settings, setting a password, as well as other administrative functions or features.

In some situations, portable electronic device 190 may require some type of input before it will begin receiving a voice command, before it will process a voice command, and/or before it will execute a voice command. For example, portable electronic device 190 may require that another type of input is received, such as a home button being pressed for a period of time, before it will begin accepting voice commands or inputs. In some situations, this other input may also be accomplished remotely. In order to accomplish this type of input, remote control apparatus 110 may establish more than one type of link or session with portable electronic device 190. For example, remote control apparatus 110 may first need to establish a keyboard link or session with portable electronic device 190 so that a message, command, or event can be sent to unlock or activate portable electronic device 190 by mimicking a pressing of the home button. Then, a voice link or session may need to be established with portable electronic device 190 so that the digitized voice file can be sent to invoke an action or function as described in the various examples herein.

In some situations, separate keyboard and voice links or sessions may not be required and all communications may be performed over a single link or a single session. In other situations, different types of links or sessions between remote control apparatus 110 and portable electronic device 190 may be required to put portable electronic device 190 in an appropriate state or mode for receiving voice commands, for processing the voice commands, and/or for executing the voice commands.

Figure 2:
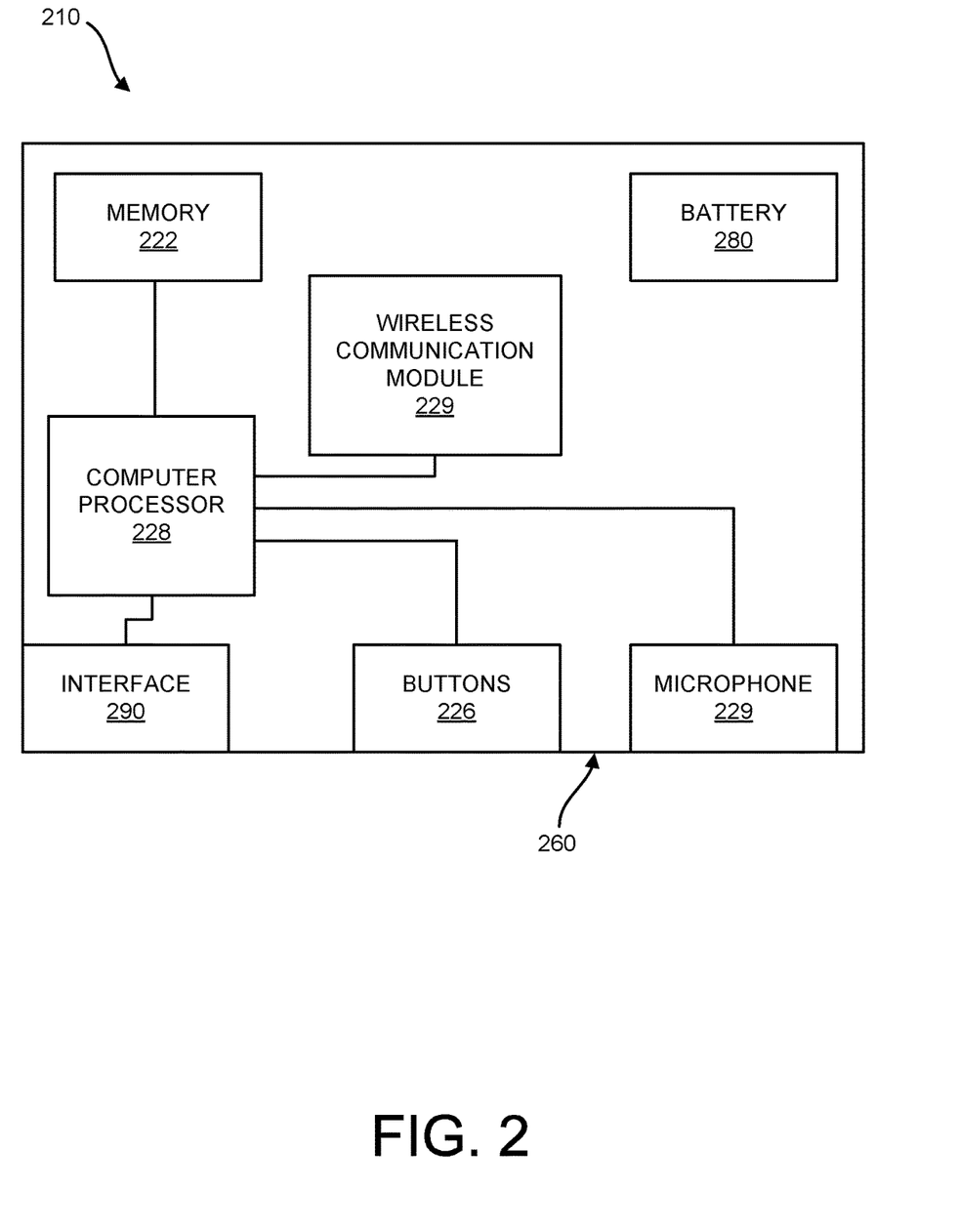
FIG. 2 illustrates a block diagram of an apparatus for remotely triggering actions on a smartphone.

FIG. 2 illustrates a block diagram of an apparatus 210 for remotely triggering actions on a smartphone or a portable electronic device, such as portable electronic device 190. Apparatus 210 is an example of apparatus 110 and may include any of the features, elements, functions, or characteristics of apparatus 110.

Apparatus 210 includes computer processor 228, memory 222, wireless communication module 229, battery 280, buttons 226, microphone 229, interface 290, and housing 260. Housing 260 contains some or all of the components of apparatus 210. In some configurations, housing 260 may be a protective housing, a water resistant housing, and/or a waterproof housing such that the components of apparatus 210 are protected from damaging forces such as water, rain, snow, mud, dust, dirt, corrosive chemicals, shock, puncture, impact, and/or vibration.

Computer processor 228 may include any type of microcontroller, microprocessor, microcomputer, central processing unit (CPU), programmable logic device, reconfigurable circuit, and/or application specific circuit that is configured or adapted to perform the techniques and methods disclosed herein. Memory 222 may include random access memory (RAM), or any other type of dynamic data storage device commonly known in the art. Memory 222 may also include one or more static storage devices such as read only memory (ROM), programmable read only memory (PROM), flash memory, magnetic memory, erasable programmable read only memory (EPROM), and/or electrically erasable programmable read only memory (EEPROM) for storing static data such as firmware or computer-executable instructions for computer processor 228 or for another computer processor. In some configurations, some or all of memory 222 may be contained within computer processor 228 and/or within one of the other elements of apparatus 210.

Wireless communication module 229 includes circuitry for performing wireless communications between apparatus 210 and other devices, such as portable electronic device 190. Wireless communication module 229 may be configured for or adapted to conducting wireless communications according to one or more known formats or protocols. Many types of wireless connection types, formats, and/or protocols are possible and the techniques here are not to be limited to any particular connection type, format, or protocol. For example, wireless communication module 229 may perform wireless communications using Bluetooth, Bluetooth Low Energy, Bluetooth Smart, Wireless Fidelity (WiFi), Near Field Communication (NFC), and/or other types, formats, or protocols for wireless communication, including combinations thereof. Wireless communication module 229 may include analog and/or digital electronic components and may be integrated into one or more other elements of apparatus 210.

Buttons 226 may include any kind of device or devices for receiving inputs or selections from a user of apparatus 210. Buttons 226 may include electrical and/or mechanical elements. Buttons 226 may include any of the elements, functions, features, or characteristics of buttons 126. While buttons 226 are described as plural, buttons 226 may include a single input device or multiple input devices. In some configurations, multiple input devices may be implemented on a single physical input device, such as implementing multiple virtual buttons on a single interactive touchscreen device. Other configurations of an input device or combinations of input devices are possible.

Battery 280 may include a battery, a rechargeable battery, a lithium ion battery, a capacitor, a supercapacitor, a solar cell, and/or a fuel cell that allows apparatus 210 to be operated, at least temporarily, without being tethered to or powered by an external power source. Battery 280 may power any combination of the other components of apparatus 210.

Interface 290 includes any type of electro-mechanical interface for making an electrical connection between apparatus 210 and another device. Interface 290 may include an electrical plug, an electrical port, and/or an electrical jack. Interface 290 may include components for interfacing to an external power source, such as an external power supply, for powering apparatus 210 and/or for recharging battery 280. Interface 290 may also include components for transferring data between apparatus 210 and another device.

Microphone 229 includes any device for receiving audio signals or audio input from a user of apparatus 210. Microphone 229 may be used for capturing audio signals or audio input for generating digitized audio files for use as described in the examples herein. As described in further detail below, audio signals or audio input may also be captured using a microphone of a smartphone or other portable electronic device and transferred to apparatus 210 through wireless communication module 229. Consequently microphone 229 may not be needed to implement some variations of the apparatuses, techniques, and improvements disclosed herein.

In one example of operation, apparatus 210 remotely triggers verbally invokable actions on a smartphone without producing audible sounds. Memory 222 stores a first digitized voice file and a second digitized voice file. The digitized voice files each comprise electronic recordings of respective voice commands that would typically be used to invoke a feature on the smartphone, request information from the smartphone, or perform some other function on the smartphone. The digitized voice files may be recordings of an actual request spoken by a human or may be computer generated files which have been created to mimic or emulate an actual human voice request. The purpose of storing these requests in the form of digitized voice files is so that they can be sent to the smartphone and received by the smartphone as if a human had just spoken the request. In other words, the voice file(s) each contain an encoded recording or representation of a respective spoken command to which the smartphone would respond if the spoken command were spoken directly into a microphone of the smartphone or transferred to the smartphone from a remote microphone such as an audio headset.

Continuing with the example above, wireless communication module 229 establishes wireless communication with the smartphone or transmits wireless communication messages for delivery to the smartphone using a wireless communication protocol. In one specific example, the wireless communication protocol may include Bluetooth Smart. Buttons 226 may include two user accessible buttons where the first user accessible button is associated with the first digitized voice file and the second user accessible button is associated with the second digitized voice. Computer processor 228 is configured or adapted to execute non-transitory instructions from memory 222 to detect the user's actuation of one of the first and the second user accessible buttons. The user actuates one of the buttons 226 on apparatus 210 when he or she wishes to invoke a feature or function of the smartphone that is associated with that button.

In response to the button actuation, computer processor 228 retrieves either the first or the second digitized voice file from memory 222 based on which of the voice files is associated with or assigned to the actuated button. Computer processor 228 then transmits the retrieved digitized voice file to the smartphone, or another electronic device, using wireless communication module 229 according and transmit it according to a wireless communication protocol in order to remotely trigger one of the verbally invokable actions on the smartphone that is associated with the retrieved digitized voice file. In other words, the user is able to remotely initiate a request that may typically be initiated through a voice command, but is able to do so without actually speaking a command and without necessarily being within physical or audible reach of the smartphone. In other examples, the apparatus 210 contains more than two digitized voice files from which additionally verbally invokable actions may triggered on a smartphone or other electronic device.

In some configurations, buttons 226 may be programmable or customizable to be associated with user preferred functions. Further, microphone 229 may be used to create the digitized voice file associated with one or more of buttons 226. In other words, a user may decide that he or she wants a first button to be associated with a request for the current weather conditions and use microphone 229 to record that spoken request. Computer processor 228 processes this spoken request to generate a digitized voice file and associate it with the selected button such that each time the button is pressed, the digitized voice file associated with the button, which includes the request for the weather conditions, is wirelessly transmitted to the smartphone.

In another configuration, recording of a user's voice command or request may initially be captured on the smartphone and transferred to apparatus 210 for storage in memory 222. In this example, computer processor 228 receives digitized audio information from the smartphone through wireless communication module 229 and stores the received audio information. This approach eliminates the need for apparatus 210 to have a microphone while still maintaining the programmable or customizable aspect of the buttons of apparatus 210. Apparatus 210 may perform additional processing on the digitized audio information received from the smartphone to put it in a proper or preferred format and/or may store the digitized audio information in the same format it is received.

A software application may also be executed on the smartphone to assist in the recording of the digitized voice files and/or for the setup, configuration, or management of apparatus 210. This may include functions such as assigning buttons, creating voice files, recording voice files, deleting old voice files, rearranging voice files, managing storage space, changing settings, pairing with electronic devices, as well as other administrative functions or features. In some examples, a system for performing the methods and techniques disclosed herein may include an apparatus, such as apparatus 210, and a software application that runs on the smartphone to assist in performing the actions discussed above.

In some examples, the smartphone that apparatus 210 is communicating with may include intelligent personal assistant software and the digitized voice file transmitted from apparatus 210 for delivery to the smartphone may be configured as a voice command to the intelligent personal assistant software to trigger the verbally invokable action on the smartphone. In some examples, the transmitted digitized voice file may be configured or adapted to have a format that is compatible with specific intelligent personal assistant software and/or may have features that are necessary or beneficial for use with the specific intelligent personal assistant software.

In one example, transmitting the retrieved digitized voice file to an electronic device may include multiple steps. For example, transmitting the retrieved digitized voice file may include transmitting a keyboard event over a keyboard link to the smartphone that mimics a long press of a home button of the smartphone for waking up the smartphone, establishing access to the smartphone and/or otherwise transitioning the smartphone to a mode in which it will receive voice commands. Once this is accomplished, the process may then proceed by transmitting the retrieved digitized voice file over a voice link to the smartphone to initiate the request or invoke the feature or action on the smartphone.

The request, feature, or action invoked on the smartphone or electronic device may include one or more of: initiating a call, listening to a voicemail, playing music, reading a text message, composing a text message, getting directions, accessing notifications, finding calendar information, adding reminders, identifying media content, changing an alarm, requesting sports information, requesting help, requesting travel information, scheduling an appointment, locating a person, transmitting a distress notification, checking time, checking date, finding a business, checking weather, checking financial information, performing a web search, requesting entertainment information, performing a calculation, and changing a setting on the smartphone. This list is not intended to be exhaustive and may include any other feature, function, or action available on the smartphone. In some situations, the request, feature, or action invoked on the smartphone or electronic device may be associated with a software application that performs a specific feature. In one example, a request for directions may invoke or make use of a map application and/or a location determination application. Many other examples and combinations are possible.

While the example above is described with respect to apparatus 210 having two buttons, any number of distinct or integrated buttons or inputs is possible. For example, apparatus 210 may include a third user accessible button associated with a third digitized voice file stored in the memory 222. Computer processor 228 may be configured to further execute the instructions to detect a user actuation of the third user accessible button, retrieve the third digitized voice file from memory 222 in response to actuation of the third user accessible button, and transmit the retrieved third digitized voice file to the smartphone using wireless communication module 229 in order to remotely trigger another verbally invokable action on the smartphone.

In another implementation, an apparatus may be configured for remotely and electronically launching a process from among a plurality of processes available on an electronic device. The apparatus may include wireless communication circuitry for establishing a wireless communication link with the electronic device using a wireless communication protocol. The apparatus may also include a user interface for receiving an input from a user of the apparatus where the user input indicates a user selection of a process from among the plurality of available processes. The apparatus may include control circuitry configured to retrieve a digitized voice file associated with the user selected process from a plurality of digitized voice files based on the user selected process and transmit an electronic message to the electronic device that includes the retrieved digitized voice file in order to launch the user selected process on the electronic device.

In some configurations, the apparatus may include an interactive control panel in addition to or in place of buttons. The interactive control panel may include an interactive touch screen, a capacitive sensing touch screen, a proximity sensor, an optical sensor, a pressure sensitive touch screen, and/or any other type of device for detecting touch, movement, or proximity of a user. In some configurations, the apparatus may include a microphone and the control circuitry and the user interface may be configured to receive verbal input from the user through the microphone to encode the verbal input to generate one or more of the digitized voice files. In other examples, the apparatus may receive one or more of the digitized voice files from another device.

Apparatus 210 may include components such as analog circuitry, digital circuitry, analog electrical components, digital electrical components, discrete electrical components, an antenna, control circuitry, a computer processor, a display element for displaying a status or mode, a printed circuit board, an electrical connector, a power source, a battery, and/or other components for implementing the functions described herein.

In one variation, apparatus 210 may be configured to capture and transmit a voice request from a user and then transmit that voice request to an electronic device as described herein in either real time or near real time. In other words, apparatus 210 may in some configurations also be used a voice remote that transfers voice requests without those voice requests necessarily needing to be prerecorded or previously stored in apparatus 210 in the form of digitized voice files.

Figure 3:
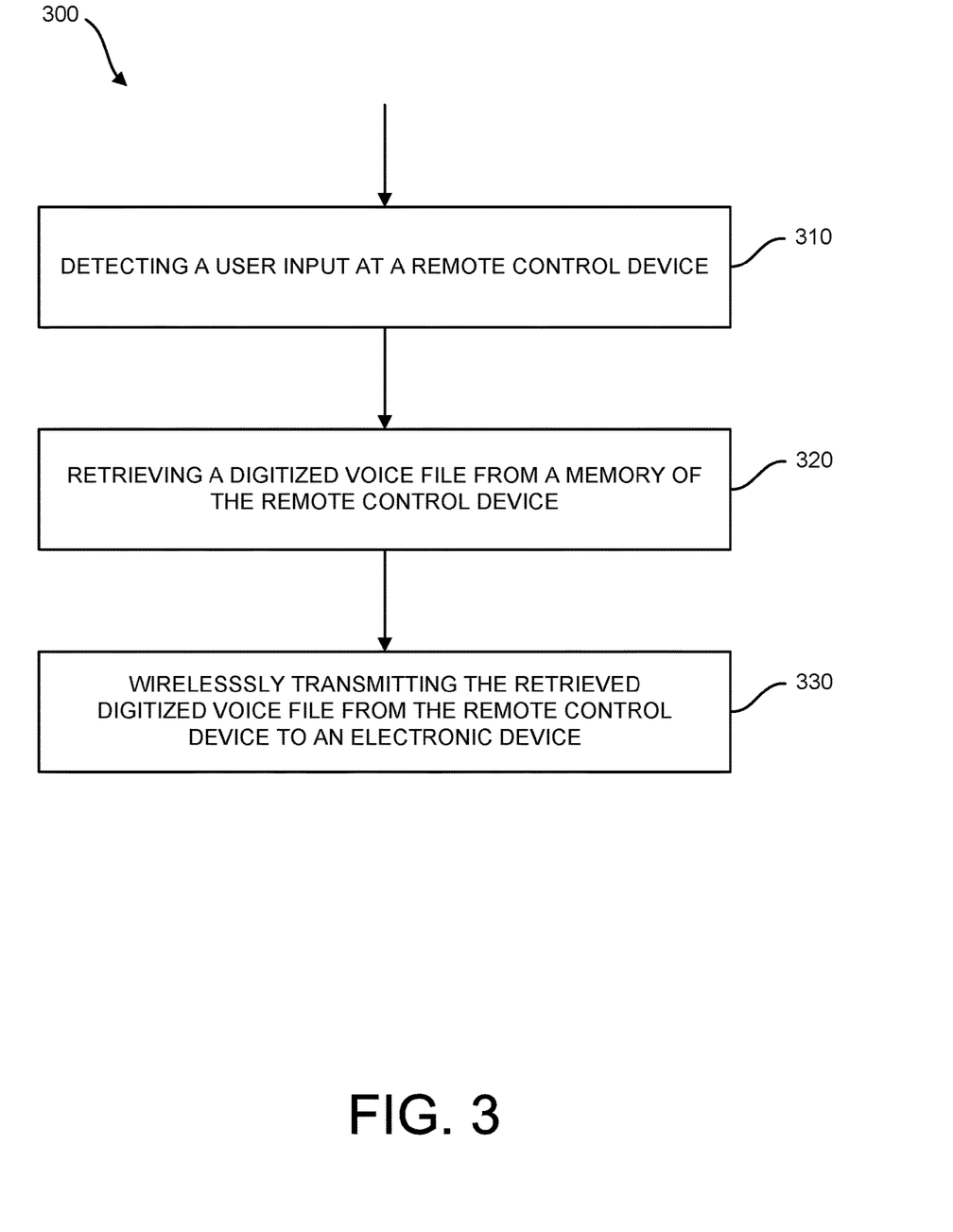
FIG. 3 illustrates a method of remotely initiating an action on a portable electronic device without producing audible sounds.

FIG. 3 illustrates method 300 of remotely initiating an action on a portable electronic device without producing audible sounds. Method 300 may be implemented on a variety of electronic hardware platforms, including any of the apparatuses disclosed herein. Method 300 includes detecting a user input at a remote control device, such as remote control apparatus 110 or apparatus 210 (step 310). Method 300 also includes retrieving a digitized voice file from a memory of the remote control device (step 320). The digitized voice file is retrieved from among a plurality of digitized voice files in the memory based on the detected user input. Method 300 also includes wirelessly transmitting the retrieved digitized voice file from the remote control device to the electronic device according to a wireless communication protocol in order to remotely initiate an action from among a plurality of actions executable on the electronic device (step 330). Many variations of method 300 are possible based on the disclosure, techniques, and variations discussed herein.

The action initiated on the portable electronic device is associated with the user input and the retrieved digitized voice file. The transmitting of the retrieved digitized voice file to the electronic device mimics delivery of a live spoken command to the electronic device from a local microphone or from a remote wireless microphone, such as a situation where a user was speaking the command into a wireless headset in communication with the electronic device or directly into the electronic device. Beneficially, the user is able to invoke the action on the electronic device without speaking, without making noise, without being within reach of the electronic device, without having to touch the electronic device, without necessarily being in close proximity to the electronic device, and/or without necessarily needing to see the electronic device.

In some variations of the examples described herein, some of the information necessary to implement the disclosed techniques and methods may be stored in the electronic device or in software being executed by the electronic device. For example, the digitized voice files may be stored on the electronic device or in software running on the electronic device. In this example, a button press on a remote control apparatus may be transmitted to the electronic device over the wireless link and the electronic device may then transmit a digitized voice file associated with the button to the remote control apparatus. The remote control apparatus may then send this digitized voice file or audio request back to the electronic device to initiate the request or process on the electronic device. While it may seem redundant to send the same voice file or audio request back to the electronic device from which it was just received, the electronic device or its operating system may be configured such that it only capable of acting on voice initiated requests or actions when they are received from an outside source, such as through a microphone of the electronic device, a remote microphone, or from another device. This type of operation may also require a software application to run in the background on the electronic device to assist in performing these functions.

In order to configure or reconfigure the apparatus to be able to remotely invoke various functions, method 300 disclosed above may also include the steps of recording an audible user input at the apparatus, encoding the audible user input, storing the encoded audible user input as one or more of the digitized voice files, and/or associating the stored one of the digitized voice files with another action of the plurality of actions executable on the portable electronic device. Method 300 may also include transmitting the retrieved digitized voice file, establishing a keyboard link with the portable electronic device, transmitting a keyboard event over the keyboard link to the portable electronic device that mimics a long press of a home button of the portable electronic device, establishing a voice link with the portable electronic device, and/or transmitting the retrieved digitized voice file over the voice link.

In another example of operation, a method of remotely invoking functions of a smartphone via the smartphone's intelligent voice assistant may include one or more of the following steps: 1) Implementing both Bluetooth (BT) audio and Bluetooth Low Energy (BLE) keyboard capability, 2) Advertising as a Bluetooth audio device to connect to a previously paired smartphone, 3) After connecting, sending a BLE home button event to the smartphone to activate the intelligent voice assistant, 4) Sending a prerecorded verbal command to the smartphone over BT audio for the intelligent voice assistant to interpret and execute, 5) If the command requires unlocking the smartphone, sending the unlock code sequence over BLE, 6) Sending a short BLE home button event to the smartphone to exit the intelligent voice assistant, and/or 7) Disconnecting the BT audio connection so audio functions on the smartphone will return to their normal state.

The techniques, elements, components, methods, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "on other examples," "in some cases," "in some situations," "in one configuration, " "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concepts and their practical application to enable others skilled in the art to best utilize the invention. It is intended that the claims be construed to include other alternative embodiments of the invention except as limited by the prior art.

What is claimed is:

1. An apparatus for remotely triggering verbally invokable actions on a smartphone without producing audible sounds, the apparatus comprising:
 a memory for storing a first digitized voice file and a second digitized voice file; a wireless communication module for establishing wireless communication with the smartphone using a wireless communication protocol;
 first and second user accessible buttons, wherein the first user accessible button is associated with the first digitized voice file and the second user accessible button is associated with the second digitized voice file; and a computer processor configured to execute non-transitory instructions to:
  detect a user actuation of one of the first and the second user accessible buttons; retrieve a one of the first and second digitized voice files from the memory that is associated with the actuated button in response to the detection of the actuated button; and
  transmit the retrieved one of the first and the second digitized voice files to the smartphone using the wireless communication module according to the wireless communication protocol to remotely trigger one of the verbally invokable actions on the smartphone that is associated with the transmitted digitized voice file;
  wherein each of the first digitized voice file and the second digitized voice file contain an encoded recording of a respective spoken command to which the smartphone would respond when the spoken command were spoken directly into a microphone of the smartphone; and
  wherein the remotely triggering verbally invokable actions on a smartphone is without producing audible sounds.

2. The apparatus of claim 1 further comprising:
  a housing containing the memory, the wireless communication module, the first and second user accessible buttons, and the computer processor; and
  a battery in the housing for powering at least the computer processor, the memory, and the wireless communication module.

3. The apparatus of claim 1 wherein the wireless communication protocol is Bluetooth Low Energy or Bluetooth Smart.

4. The apparatus of claim 1 further comprising a microphone, wherein the computer processor is further configured to execute the instructions to receive audio information from the user through the microphone and process the audio information to generate one or more of the first digitized voice file and the second digitized voice file.

5. The apparatus of claim 1 wherein the computer processor is further configured to execute the instructions to:
  receive digitized audio information from the smartphone through the wireless communication module; and
  store the digitized audio information received from the smartphone in the memory, wherein one of the first digitized voice file and the second digitized voice file comprises the digitized audio information received from the smartphone.

6. The apparatus of claim 1 wherein the smartphone includes intelligent personal assistant software and the one of the first and the second digitized voice files transmitted from the apparatus to the smartphone includes a voice command for delivery to the intelligent personal assistant software to trigger the one of the verbally invokable actions.

7. The apparatus of claim 6 wherein the intelligent personal assistant software of the smartphone includes speech interpretation and recognition interface.

8. The apparatus of claim 1 wherein transmitting the retrieved one of the first and second digitized voice files includes:
  transmitting a keyboard event over a keyboard link to the smartphone that mimics a long press of a home button of the smartphone; and
  transmitting the retrieved one of the first and the second digitized voice files over a voice link.

9. The apparatus of claim 1 wherein the verbally invokable actions include one or more of: initiating a call, listening to a voicemail, playing music, reading a text message, composing a text message, getting directions, accessing notifications, finding calendar information, adding reminders, identifying media content, changing an alarm, requesting sports information, requesting travel information, scheduling an appointment, locating a person, checking time, checking date, finding a business, checking weather, checking financial information, performing a web search, requesting entertainment information, performing a calculation, and changing a setting on the smartphone.

10. The apparatus of claim 1 further including a third user accessible button associated with a third digitized voice file stored in the memory, where the computer processor is configured to further execute the instructions to:
  detect a user actuation of the third user accessible button;
  retrieve the third digitized voice file from the memory in response to the detected actuation of the third user accessible button; and
  transmit the retrieved third digitized voice file to the smartphone using the wireless communication module according to the wireless communication protocol in order to remotely trigger another verbally invokable action on the smartphone.

11. An apparatus for remotely and electronically launching a process from among a plurality of processes available on an electronic device, the apparatus comprising:
  wireless communication circuitry for establishing a wireless communication link with the electronic device using a wireless communication protocol;
  a user interface for receiving an input from a user of the apparatus, wherein the input indicates a user selection of a process from among the plurality of available processes; and control circuitry configured to:
  retrieve a digitized voice file associated with the user selected process from among a plurality of digitized voice files based on the user selected process; and
  transmit an electronic message that includes the retrieved digitized voice file for delivery to the electronic device over the wireless communication link, the electronic message comprising a request to launch the user selected process on the electronic device;
  wherein the user interface includes a plurality of buttons actuatable by a user, wherein actuation of one of the plurality of buttons indicates a selection of the process without verbal input and without producing audible sounds;
  wherein each of the digitized voice file associated with the user selected process from among a plurality of digitized voice files contains an encoded recording of a respective spoken command to which the electronic device would respond when the spoken command were spoken directly into a microphone of the electronic device.

12. The apparatus of claim 11 wherein the user interface includes an interactive control panel.

13. The apparatus of claim 11 wherein the wireless communication circuitry includes an antenna and the wireless communication protocol includes Bluetooth Smart.

14. The apparatus of claim 11 wherein the electronic device include personal assistant software and to launch the user selected process on the electronic device includes to remotely initiate the process through the personal assistant software on the electronic device without providing audible input to the electronic device.

15. The apparatus of claim 11 further including a microphone configured to receive verbal input from the user through the microphone and wherein the control circuitry is further configured to encode the verbal input to generate one or more of the plurality of digitized voice files.

16. A method of remotely initiating a voice invokable action on a portable electronic device without producing audible sounds, the method comprising:
   detecting a user input at a remote control device;
   retrieving a digitized voice file from a memory of the remote control device, wherein the digitized voice file is selected from among a plurality of digitized voice files in the memory based on the user input; and
   wirelessly transmitting the retrieved digitized voice file from the remote control device to the portable electronic device according to a wireless communication protocol in order to remotely select and initiate the voice invokable action from a plurality of actions executable on the portable electronic device, the voice invokable action associated with the user input and the retrieved digitized voice file, the transmitting of the retrieved digitized voice file to the portable electronic device mimicking a spoken command transmitted to the electronic device from a wireless microphone that is separate from the portable electronic device;
   wherein initiating a voice invokable action on a portable electronic device is without producing audible sounds; and
   wherein, prior to the detecting of the user input: recording an audible user input at the remote control device; digitally encoding the audible user input; storing the digitally encoded audible user input as a second digitized voice file; and associating the stored second digitized voice file with another action of the plurality of actions executable on the portable electronic device.

17. The method of claim 16 wherein wirelessly transmitting the retrieved digitized voice file includes:
   establishing a keyboard link with the portable electronic device;
   transmitting a keyboard event over the keyboard link for delivery to the portable electronic device that mimics a long press of a home button of the portable electronic device;
   establishing a voice link with the portable electronic device; and
   transmitting the retrieved digitized voice file over the voice link.

* * * * *